United States Patent [19]

Christian et al.

[11] 4,252,244
[45] Feb. 24, 1981

[54] LAYERED PRESSURE VESSEL HEAD WITH MACHINED SURFACES

[75] Inventors: Ralph R. Christian; Richard E. Schuessler, both of St. Louis, Mo.

[73] Assignee: Nooter Corporation, St. Louis, Mo.

[21] Appl. No.: 40,480

[22] Filed: May 18, 1979

[51] Int. Cl.³ .................... B65D 6/10; B65D 8/04
[52] U.S. Cl. .................................... 220/3; 220/83
[58] Field of Search ............. 220/3, 66, 67, 68, 83

[56] References Cited

U.S. PATENT DOCUMENTS

| | | | |
|---|---|---|---|
| 1,925,118 | 9/1933 | Stresau | 220/3 |
| 2,337,247 | 12/1943 | Kepler | 220/3 |
| 2,652,943 | 9/1953 | Williams | 220/3 X |
| 2,684,528 | 7/1954 | Rossheim et al. | 220/3 |
| 2,933,214 | 4/1960 | Douyard | 220/83 X |
| 3,457,961 | 7/1969 | Long | 220/3 |
| 3,604,587 | 9/1971 | Pechacek | 220/83 X |

*Primary Examiner*—Steven M. Pollard
*Attorney, Agent, or Firm*—Gravely, Lieder & Woodruff

[57] ABSTRACT

A head for a pressure vessel has a contoured liner and successive wraps that overlie the liner and conform in contour to it. The liner has a machined outwardly presented surface, whereas the wrap immediately over it has a machined inwardly presented surface, and the liner and wrap are welded together with their opposed machined surfaces in face-to-face contact. The same holds true with the successive wraps so that two adjacent wraps are in face-to-face contact along their machined surfaces. A wrap may be heated prior to being placed over the liner or over another wrap so that upon cooling the wrap shrinks and places the underlying liner and wraps in a state of precompression. Both the liner and the various wraps may be formed from segments which are dished to the proper contour, then welded together into a rough liner or wrap, and finally machined along the appropriate surfaces. They may likewise be formed from single plates, forgings or castings.

15 Claims, 7 Drawing Figures

LAYERED PRESSURE VESSEL HEAD WITH MACHINED SURFACES

BACKGROUND OF THE INVENTION

This invention relates in general to pressure vessels and more particularly to a layered head for a pressure vessel, with the head having machined surfaces, and to a method of producing such a head.

The typical pressure vessel has a cylindrical shell and heads that close the two ends of the shell. The shell and heads are manufactured as separate components and are thereafter joined together by welding to produce a unitary structure. To enable the heads to better withstand elevated pressures, they are usually dome-shaped.

It is generally recognized that pressure vessel walls composed of multiple layers are superior to thick solid walls in many respects. For example, the individual plates of a layered wall, generally speaking, having better metallurgical properties than thick solid walls, since they are subjected to greater rolling at the mill. As a consequence, a layered vessel is usually stronger than a solid wall vessel of equivalent wall thickness. Similarly, because of their better metallurgical properties, the individual layers of layered walls do not tend to laminate as sometimes occurs with solid walls. Also, in layered vessels it is possible to vary the metal alloy from layer to layer, thus enabling an expensive corrosion resistant liner to be used with less expensive surrounding layers. While a variety of thick steel plate clad with various corrosion resistant alloys is available from steel mills, it is expensive. Moreover, thin layers are relatively easy to shape, but this is not the case with the heavy steel plate used in solid wall vessels. Thus, layered walls can be manufactured in greater thicknesses than solid walls. Aside from that, the individual layers that comprise the walls of a layered vessel, upon being welded together, tend to shrink as the welds which join them solidifiy and cool, and this places the inner layers in a state of precompression. This is desirable since the elevated pressures within the vessel create tensile forces in the vessel walls. In contrast, solid wall vessels are normally heat treated to relieve them of stress concentrations, and therefore do not exist in a state of precompression.

Heretofore different procedures have been developed for fabricating cylindrical shells from multiple layers, one highly successful procedure being set forth in U.S. Pat. No. 3,478,784. Heads, by reason of their compound curvatures, are not so easily fabricated in multiple layers, and as a consequence most heads are still of the solid wall construction. Thus, to a large measure, the pressures to which present pressure vessels may be raised are set by the heads at their ends.

SUMMARY OF THE INVENTION

One of the principal objects of the present invention is to provide a layered head for a pressure vessel, with the adjacent layers of wraps of the head conforming precisely to each other in contour. Another object is to provide a head of the type stated in which adjacent wraps are seated tightly against each other. A further object is to provide a head of the type stated which can withstand extremely high pressures without rupturing. An additional object is to provide a head of the type stated which may be fabricated with its inner layers in a state of precompression. Still another object is to provide a head of the type stated, the several layers of which have machined contacting surfaces. Yet another object is to provide a process for producing a head of the type stated. These and other objects and advantages will become apparent hereinafter.

The present invention is embodied in a pressure vessel head comprised of a plurality of contoured layers arranged in succession with the opposed surfaces of adjacent layers being machined to matching contour and in face-to-face contact. The invention also involves the process for producing the head, and that process involves providing contoured rough layers, machining the appropriate surfaces in these layers, and fitting the layers together such that their machined surfaces are in face-to-face contact. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
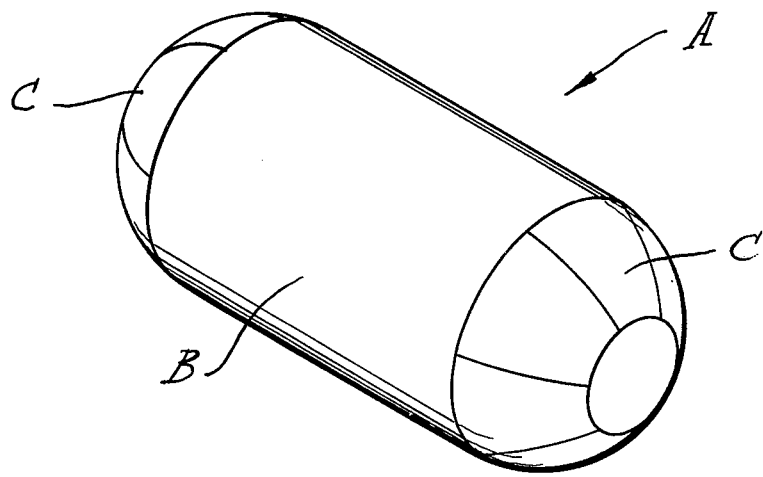
FIG. 1 is a perspective view of a pressure vessel having head constructed in accordance with and embodying the present invention.

Referring now to the drawings (FIG. 1), A designates a pressure vessel including a shell B and heads C which extend across and close the ends of the shell B. The shell B is cylindrical in configuration and may be a single wall structure or a layered structure. A separate head C is welded to each end of the shell B, and each head C curves outwardly away from its end of the shell B so that the end of the pressure vessel is convex or dome-shaped. While the specific curvature of the head C may be critical from the standpoint of a particular application, it is not critical insofar as the general principles of construction are concerned. Those principles apply to hemispherical heads as well as heads of lesser contour such as ellipsoidal heads. They likewise apply to all curved heads, irrespective of whether they have auxiliary shapes and appendages such as inspection ports, flues, and extensions. Also it should be recognized that a suitable pressure vessel may be produced without the shell B, that is with the heads C joined directly together.

Each head C includes a liner 2 (FIG. 2) that is presented inwardly toward the interior of the vessel A and a plurality of successive wraps 4, 6 and 8 that overlie the liner 2. Since the liner 2 is exposed to the contents of the vessel, it is desirable to fabricate it from a metal that is inert to those contents, or to have it clad with a substance that is not attacked by the contents. The strength of the head C is determined to a large measure, by the thickness of the individual wraps 4, 6, and 8 and the number of them, and while these factors may be important insofar as an individual application is concerned, they are not critical as to the principles of the invention. Therefore only the three wraps 4, 6, and 8 are illustrated and described, it being understood that more or less wraps may be present to vary the strength of the head C. The wraps 4, 6 and 8 are arranged in that order from the liner 2, and accordingly the wrap 4 is immediately next to the liner 2, while the wrap 8 is exposed outwardly. The liner 2 and wraps 4, 6 and 8 have circular ends 10 which are flush and along these ends they are welded together to provide a unitary structure. Perhaps the simplest configuration for the head is that of a hemisphere, although it should be recognized that the principles of this invention apply to the heads of other configurations, such as ellipsoidal.

The liner 2, like the head C itself, is hemispherical in configuration. It must resist attack by the contents of the vessel A, and to this end it should be fabricated from a metal having that capability or should at least be clad with such a metal. In all but extremely small sizes, it is convenient to fabricate the liner 2 from several gores 20 (FIGS. 2 & 4) and a dished cap 22 (FIG. 5), all of which are joined together in a hemispherical shape by welds 24. The gores 20 and cap 22 constitute segments of the final shape, that is the liner 2. Once the gores 20 and cap 22 are welded together, the shape that is so formed is machined down until its outer surface has a truly hemispherical configuration.

Figure 3:
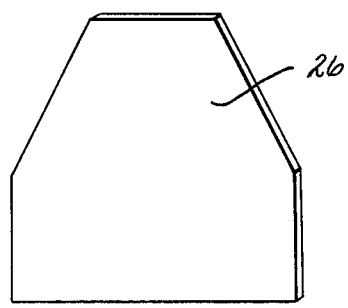
FIG. 3 is a plan view of a cut plate from which a typical gore is made.

To provide a gore 20 the outline of a rough gore is laid out on flat steel plate. Then the plate is cut along the outline to provide a cut plate 26 (FIG. 3). Next the cut plate 26 is formed into the desired contour in a dishing operation. As the plate 26 approaches the desired contour, its curvature is checked with a contour template. Thereafter, the deformation proceeds much more slowly until the curvature of the plate 26 matches that of the template. Of course, with a dishing procedure of this nature, it is impossible to acquire a precise match with the gage. Hence, the subsequent machining.

Figure 4:
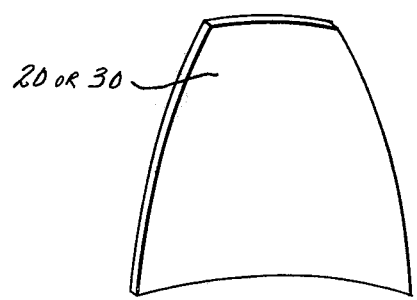
FIG. 4 is a perspective view of a typical gore for the liner or one of the wraps.
Figure 5:
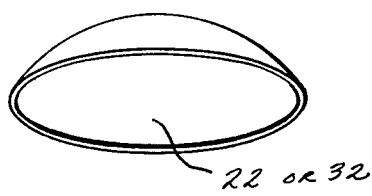
FIG. 5 is a perspective view of a typical cap for the liner or one of the wraps.

After the rough cut plate 26 is dished to the proper contour, the configuration of the actual gore 20 is laid out upon it and the plate 26 is trimmed along the marking to provide the trimmed gore 20 (FIG. 4). This trimming may be achieved by flame cutting, by machining, by air arcing, or by friction sawing.

The cap 22 is also derived from a flat plate of thickness equal to that of the plates 26 from which the gores 20 are formed. This plate is likewise laid out and cut in the rough and then is dished to the desired contour.

The several gores 20 and the cap 22 are then fitted together and welded into a hemispherical shape, and in so doing the welds 24 are made between adjacent gores 20 and between the gores 20 and the cap 22. The hemispherical shape represents the liner 2 absent any machining.

The hemispherical shape is then machined to provide its outside surface with a truly hemispherical configuration. The machining takes place only along the outside surface. Various machines are available for machining hemispheres and other curvatures of a similar nature, one such being a multiaxis numerical control machine. The machining operation produces the finished liner 2.

The several wraps 4, 6 and 8 are formed in an almost identical manner. Considering first the wrap 4, it includes gores 30 (FIG. 2) and a cap 32 which are joined together into a hemispherical shape by welds 34. The gores 30 and cap 32 are derived from flat plate which is dished to the desired contour. The metal of the plates is selected primarily for its strength, with little or no consideration given to its ability to resist attack by the contents of the vessel A, since the liner 2 isolates the wrap 4 from the interior of the vessel A. Carbon, low alloy, or high strength steels are ideally suited for the plate from which the gores 30 and cap 32 are formed. Moreover, the plate is usually somewhat thicker than the plate from which the corresponding gores 20 and cap 22 of the liner 2 are formed, even though the wrap 4 may have the same wall thickness as the liner 2. Thereafter the gores 30 and 32 are welded together into a hemispherical shape, and this shape is machined on its inside and outside surfaces such that those surfaces are truly hemispherical.

The diameter of the inside surface should equal that of the machined outside surface on the liner 2 or it should be slightly smaller. Moreover, the gores 30 and cap 32 are provided with weep holes 36 (FIG. 2) in a drilling operation, and these holes extend completely through the gores 30 and cap 32. In contrast, the liner 2 has no weep holes, so that it is completely impervious to the contents of the vessel A.

Once the wrap 4 is completed, it is placed over the liner 2. Where the inside surface of the wrap 4 is machined to precisely the same diameter as the outside surface of the liner 2, the wrap 4 and liner 2 should fit together relatively easily and their opposed surfaces come into perfect face-to-face contact. If not, a slight amount of force will bring them into face-to-face contact. On the other hand, where the inside surface of the wrap 4 is slightly smaller than the outside surface of the liner 2, the wrap 4 is heated to expand it, and while in the expanded condition it is placed over the liner 2. Heating to about 600° F. should be sufficient in most instances, and this heating further has the effect of tempering the welds 34. As the wrap 4 cools, it shrinks and thus places the liner 2 around which it is disposed in a state of precompression which is desirable since the pressurized contents of the vessel expand the head C and produce tensile stresses in it.

Figure 2:
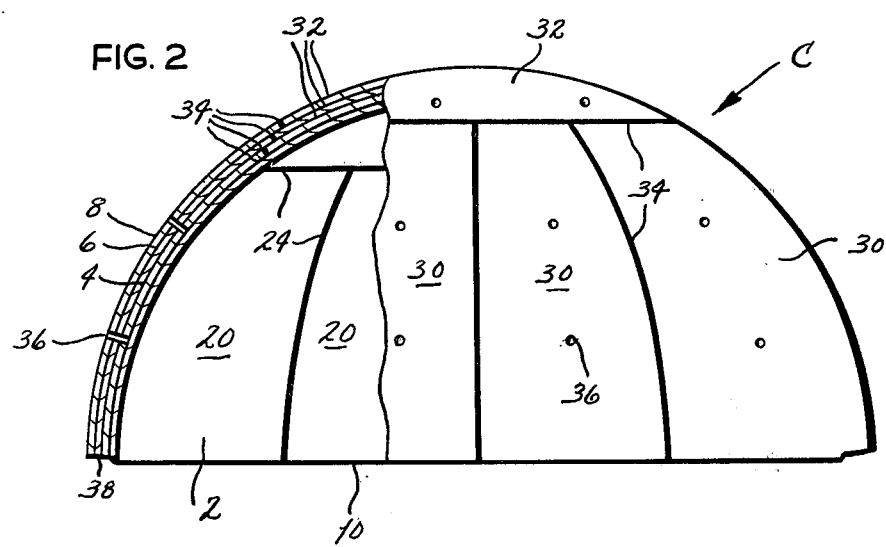
FIG. 2 is an elevation view of one of the heads, with the head being partially broken away and in section.

Once the wrap 4 is in place over the liner 2, the wrap 4 and liner 2 are joined together along their circular ends 10 by a circular weld 38 (FIG. 2).

The wrap 6 is fabricated in the same manner as the wrap 4, only it is of slightly greater diameter. The same holds true as to the final wrap 8, but it need only be machined on its inside surface since its outside surface is exposed outwardly. The circular end 10 of the wrap 6 is welded to the end 10 of the wrap 4, while the end 10 of the wrap 8 is welded to the end of the wrap 6, thus completing the head C.

After the head C is completed it is welded along its end to the end of the shell B and thus closes the end of the shell B.

When the interior of the vessel A is pressurized, the liner 2 and the wraps 4, 6, and 8 of the head C are subjected to tensile stresses. However, the head C is better able to withstand those tensile stresses than a conventional solid wall head. In the first place, the individual layers, that is the liner 2 and the wraps 4, 6, and 8, have better metallurgical properties than a thick wall, so the head C is stronger than a solid wall head of equivalent thickness. Secondly, when the various wraps 4, 6, and 8 are heat shrunk about the liner 2 and themselves, the inner layers of the head C are in a state of precompression, so the vessel A may be raised to greater pressures before the point of failure. Also, the plates from which the liner 2 is made are relatively thin and therefore easy to shape to the desired contour prior to machining. Moreover, where the contents of the vessel are corrosive, only the liner 2 need be made from a corrosion-resistant metal. Since expensive clad metals are not required, a considerable saving is experienced in the cost of materials. Should a leak develop in the liner 2, the leakage through the liner 2 will migrate through the weep holes 36 and appear at the exterior surface of the head C, thus indicating the presence of a defect long before the defect becomes great enough to cause a major and perhaps dangerous rupture.

Where the head C has a relatively small diameter, the liner 2 and the various wraps 4, 6, and which overlie it may be formed in one piece by a pressing operation. Also, where the liner 2 and wraps 4, 6, and 8 are formed from segments that are welded together, those segments may assume a wide variety of configurations and need not necessarily be the specific configurations illustrated for the gores 20 and 30 and caps 22 and 32. For example, the gores may extend all the way to the axial center of the head C, in which case they will have a more triangular configuration.

While a hemispherical head is perhaps the easiest to fabricate, comparable heads using machined liners and wraps may be manufactured in other configurations such as ellipsoidal, conical, and torispherical. Also the heads may be provided with various appendages such as extensions, inspection ports, and flues.

Figure 6:
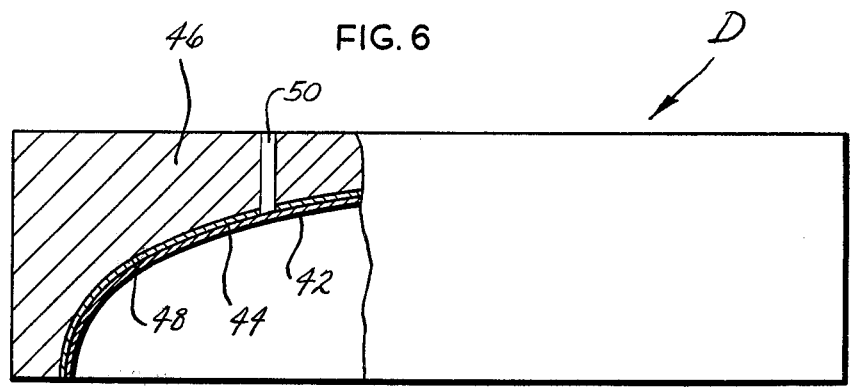
FIG. 6 is a side elevational view, partially broken away and in section, of a modified head constructed in accordance with the present invention.

A modified head D (FIG. 6) is quite similar to the head C in that it includes a liner 42 and an overlying wrap 44, both of which are fabricated and fitted together in accordance with the foregoing discussion. As such, the wrap 44 has a machined outwardly presented surface. The wrap 44, instead of being fitted into another similarly fabricated wrap, fits into a forging 46 having a cavity defined by machined surface 48. This cavity receives the wrap 44 and the liner 42. The surface 48 thus conforms in contour to the machined outwardly presented surface on the wrap 44. The forging 46 may be shrunk over the wrap 44 and liner 42 in accordance with the foregoing discussion. In essence, the forging 46 is another wrap, although it is somewhat thicker and of different external configuration than the wraps 4, 6 and 8 heretofore considered. Both the wrap 44 and the overlying forging 46 are provided with weep holes 50.

Figure 7:
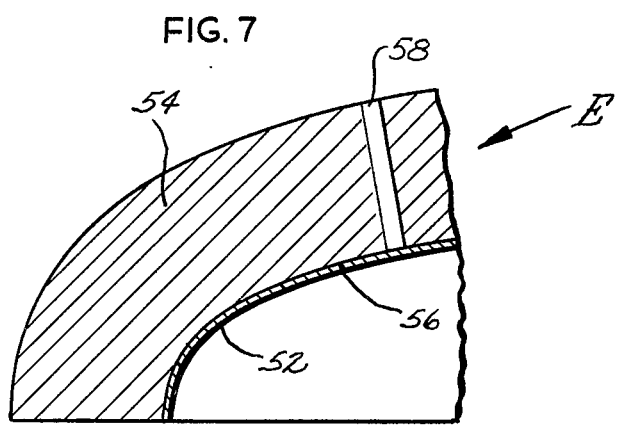
FIG. 7 is a sectional view of still another modified head.

In still another modified head E (FIG. 7), the liner 52 fits directly into and against a forging 54. The liner 52 has a machined outwardly presented surface, while the forging 54 has a machined inwardly presented surface 56 and also a weep hole 58 extending away from the surface 56. The liner 52 and forging 54 may be shrunk together. Again, the forging 54 may be considered another wrap.

In lieu of the forgings 46 and 54, castings may be utilized.

This invention is intended to cover all changes and modifications of the example of the invention herein chosen for purposes of the disclosure which do not constitute departures from the spirit and scope of the invention.

What is claimed is:

1. A head for a pressure vessel, said head comprising: a liner having a large diameter end that attaches to a component for the pressure vessel and is contoured such that it extends away from the large diameter end, the liner having a machined outwardly presented surface; and a first wrap overlying the liner and having a machined inwardly presented surface that corresponds in contour to the machined outwardly presented surface of the liner, the machined inwardly presented surface of the wrap being in face-to-face contact with the machined outwardly presented surface of the liner over substantially the entire areas of the machined surfaces.

2. A head according to claim 1 wherein the first wrap has a machined outwardly presented surface, and further comprising a second wrap overlying the first wrap and having a machined inwardly presented surface that corresponds in contour to the machined outwardly presented surface of the liner, the machined inwardly presented surface of the second wrap being in face-to-face contact with the machined outwardly presented surface of the first wrap over substantially the entire areas of such surfaces.

3. A head according to claim 1 wherein the first wrap exerts a compressive force on the liner so that the liner is in a state of precompression.

4. A head according to claim 1 wherein the first wrap has weep holes that extend completely through it, but the liner is impervious to fluid contents of a vessel.

5. A head according to claim 1 wherein the first wrap is comprised of a plurality of segments and welds joining the segments together in a configuration that conforms to the liner; and wherein both the segments and welds of the first wrap are machined.

6. A head according to claim 5 wherein the liner is comprised of a plurality of segments and welds that join the segments together; and wherein both the segments and welds of the liner are machined.

7. A head according to claim 6 wherein the first wrap and the liner each includes gores along its sides and a single cap at its end remote from the large diameter end, the cap being dished and circular.

8. A head according to claim 1 wherein the first wrap has a machined outwardly presented surface, and further comprising a plurality of additional wraps overlying the first wrap and arranged in succession away from the first wrap, each additional wrap having a machined inwardly presented surface, each additional wrap that has a wrap overlying it further having a machined outwardly presented surface, the machined inwardly presented surface of each additional wrap conforming in contour to and being a face-to-face contact with the machined outwardly presented surface of the wrap that underlies it.

9. A process for producing a head for a pressure vessel, said process comprising: providing a rough liner having a large circular end and an opposite end that is spaced axially from the circular end; machining the outwardly presented surface of the rough liner to a predetermined contour; providing a first wrap that conforms generally to the contour of the liner; machining the inwardly presented surface of the first wrap to conform within limits to the machined outwardly presented surface of the liner; and placing the wrap over the liner to bring the machined outwardly presented surface of the liner into face-to-face contact with the machined inwardly presented surface of the wrap over substantially the entire areas of such surfaces.

10. The process according to claim 9 and further comprising machining the outwardly presented surface of the first wrap to a predetermined contour; providing a second wrap; machining the inwardly presented surface of the second wrap to conform within limits to the machined outwardly presented surface of the first wrap;

placing the second wrap over the first wrap to bring the machined inwardly presented surface of the second wrap into face-to-face contact with the machined outwardly presented surface of the first wrap over substantially the entire areas of such surfaces.

11. The process according to claim 10 wherein the step of providing the rough liner comprises deforming a plurality of plates into liner segments of predetermined curvatures, and welding the liner segments together.

12. The process according to claim 10 wherein the step of providing the first wrap comprises deforming a plurality of plates into wrap segments of predetermined contour, and welding the wrap segments together.

13. The process according to claim 10 and further comprising machining the outwardly presented surface of the first wrap; providing additional wraps sized to be placed in succession over the first wrap with each succeeding wrap being over the first wrap; machining the outwardly presented surfaces of all of the additional wraps that will be covered by a wrap, machining the inwardly presented surfaces of the additional wraps to match within limits the contour of the machined outwardly presented surfaces of the wraps that they will overlie, and fitting the wraps together such that the opposed machined surfaces of adjacent wraps are in face-to-face contact.

14. The process according to claim 9 and wherein the inwardly presented surface of the first wrap is machined to a size slightly smaller than the machined outwardly presented surface of the liner; and further comprising heating the first wrap prior to placing it over the liner, with the heating being to a temperature high enough to expand the first wrap sufficiently to enable it to fit over the liner; and allowing the first wrap to cool and contract into snug face-to-face contact with the first wrap.

15. In combination with a pressure vessel component such as a shell or a head, a pressure vessel head attached to that component, said head comprising: a plurality of layers arranged in succession, one after the other, each layer being contoured so that it has a large circular end located at the pressure vessel component and an opposite end that is offset axially from the large circular end, adjacent layers having opposed surfaces which are machined such that they match in contour and are in face-to-face contact over substantially the entire areas of such surfaces.

* * * * *